United States Patent
Kepple et al.

(10) Patent No.: US 11,694,304 B2
(45) Date of Patent: Jul. 4, 2023

(54) JOINTLY LEARNING VISUAL MOTION AND CONFIDENCE FROM LOCAL PATCHES IN EVENT CAMERAS

(71) Applicant: SAMSUNG ELECTRONICS CO., LTD., Suwon-si (KR)

(72) Inventors: Daniel Robert Kepple, Fort Lee, NJ (US); Dae Won Lee, Princeton, NJ (US); Ibrahim Volkan Isler, Saint Paul, MN (US); Kanaka Rajan, New York, NY (US); Il Memming Park, Stony Brook, NY (US); Daniel Dongyuel Lee, Tenafly, NJ (US)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 293 days.

(21) Appl. No.: 17/105,028

(22) Filed: Nov. 25, 2020

(65) Prior Publication Data

US 2021/0158483 A1    May 27, 2021

Related U.S. Application Data

(60) Provisional application No. 62/940,380, filed on Nov. 26, 2019.

(51) Int. Cl.
*G06T 3/40* (2006.01)
*G06T 7/00* (2017.01)
(Continued)

(52) U.S. Cl.
CPC .......... *G06T 3/4046* (2013.01); *G06N 3/045* (2023.01); *G06T 7/246* (2017.01); *G06T 7/97* (2017.01)

(58) Field of Classification Search
CPC ... G06T 7/10; G06T 7/11; G06T 7/248; G06T 7/254; G06T 7/215; G06T 2207/20112;
(Continued)

(56) References Cited

U.S. PATENT DOCUMENTS 10,345,447 B1 *  7/2019 Hicks .................... G01S 7/4863
10,842,415 B1 * 11/2020 Jagannathan .......... G16H 50/20
(Continued)

FOREIGN PATENT DOCUMENTS

| CN | 109389035 A | * | 2/2019 | |
| CN | 111107287 A | * | 5/2020 | ............. H04N 5/144 |

(Continued)

OTHER PUBLICATIONS

European Search Report dated Jul. 22, 2022 by the European Patent Office in Patent Application No. 20892703.8.
(Continued)

*Primary Examiner* — Ian L Lemieux
*Assistant Examiner* — Woo C Rhim
(74) *Attorney, Agent, or Firm* — Sughrue Mion, PLLC

(57) ABSTRACT

A method may include obtaining a set of events, of a set of pixels of a dynamic vision sensor, associated with an object; determining a set of voltages of the set of pixels, based on the set of events; generating a set of images, based on the set of voltages of the set of pixels; inputting the set of images into a first neural network configured to output a visual motion estimation of the object; inputting the set of images into a second neural network configured to output a confidence score of the visual motion estimation output by the first neural network; obtaining the visual motion estimation of the object and the confidence score of the visual motion estimation of the object, based on inputting the set of images
(Continued)

into the first neural network and the second neural network; and providing the visual motion estimation of the object and the confidence score.

20 Claims, 6 Drawing Sheets

(51) Int. Cl.
  *G06T 7/246* (2017.01)
  *G06N 3/045* (2023.01)
(58) Field of Classification Search
  CPC ........... G06T 7/20; G06T 7/246; G06T 7/579;
    G06T 7/70; G06T 7/73; G06T 7/75;
    G06T 2207/20081; G06T 2207/20084;
    G06V 10/20; G06V 10/22; G06V 10/25;
    G06V 10/40; G06V 10/44; G06V 40/20;
    G06V 20/58; G06V 30/19013; G06V
    10/70; G06V 10/82; G06K 9/00523;
    H04N 5/341; H04N 5/23251; H04N
    5/23254; H04N 5/144; H04N 5/145;
    H04N 5/2354; G06N 3/02; G06N 3/08;
    G06N 20/00
  See application file for complete search history.

(56) References Cited

U.S. PATENT DOCUMENTS

| 10,928,820 | B1* | 2/2021 | Tao ........................ G05D 1/0214 |
| 2015/0194454 | A1* | 7/2015 | Kim .................. H01L 27/14638 250/208.1 |
| 2015/0302710 | A1* | 10/2015 | Jin ....................... H04N 5/3696 348/155 |
| 2016/0078001 | A1 | 3/2016 | Wang et al. |
| 2016/0078321 | A1 | 3/2016 | Wang et al. |
| 2017/0032538 | A1* | 2/2017 | Ernst .................... A61B 5/1127 |
| 2017/0084044 | A1* | 3/2017 | Keh ..................... H04N 13/271 |
| 2018/0259960 | A1 | 9/2018 | Cuban et al. |
| 2020/0154064 | A1* | 5/2020 | Berner ............... H04N 5/37455 |
| 2020/0249764 | A1* | 8/2020 | Page .................... G06V 10/454 |
| 2020/0348755 | A1* | 11/2020 | Gebauer .............. G06V 10/764 |
| 2021/0044742 | A1* | 2/2021 | Berkovich ........ H01L 27/14636 |
| 2021/0142086 | A1* | 5/2021 | Berkovich ........... G06N 3/0454 |
| 2021/0377453 | A1* | 12/2021 | Nistico ..................... G06T 7/10 |
| 2022/0148432 | A1* | 5/2022 | Nakagawa .............. G06T 7/215 |

FOREIGN PATENT DOCUMENTS

| DE | 102019218129 A1 * | 5/2021 |
| KR | 20140005421 A * | 1/2014 |
| KR | 20140056986 A * | 5/2014 |
| KR | 10-2016-0091786 A | 8/2016 |
| KR | 10-2019-0099185 A | 8/2019 |
| KR | 20200067334 A * | 6/2020 |
| KR | 20200138673 A * | 12/2020 |
| WO | WO-2020063332 A1 * | 4/2020 ........... H04N 5/2253 |

OTHER PUBLICATIONS

Kepple Daniel R et al: "Jointly Learning Visual Motion and Confidence from Local Patches in Event Cameras", Aug. 2020 (Aug. 2020), arxiv.org, pp. 500-516, XP047568580.
Kepple Daniel R. et al: "Joint Learning Visual Motion and Confidence from Local Patches in Event Cameras—Supplementary Material 1", , Aug. 2020 (Aug. 2020), pp. 1-4, XP055940066.
Liu Hongjie et al: "Combined frame and event-based detection and tracking", 2016 IEEE International Symposium on Circuits and Systems (ISCAS), IEEE, May 22, 2016 (May 22, 2016), pp. 2511-2514, XP032942109.
Mitrokhin Anton et al: "Event based Moving Object Detection and Tracking", 2018 IEEE/RSJ International Conference on Intelligent Robots and Systems (IROS), IEEE, Oct. 2018 (Oct. 2018), pp. 6895-6902, XP033491047.
International Search Report and Written Opnion dated Feb. 26, 2021 by the International Searching Authority in counterpart International Patent Application No. PCT/KR2020/16995. (PCT/ISA/220/210/237).

* cited by examiner

JOINTLY LEARNING VISUAL MOTION AND CONFIDENCE FROM LOCAL PATCHES IN EVENT CAMERAS

CROSS-REFERENCE TO RELATED APPLICATION(S)

This application is based on and claims priority under 35 U.S.C. § 119 to U.S. Provisional Patent Application No. 62/940,380, filed on Nov. 26, 2019, in the U.S. Patent & Trademark Office, the disclosure of which is incorporated by reference herein in its entirety.

BACKGROUND

1. Field

The disclosure relates to performing motion estimation using an event-based camera (DVS) such as a dynamic vision sensor.

2. Description of Related Art

Individual pixels in an event-based camera report only when there is an above-threshold change in the log light intensity in its field of view. Such an operation can be performed extremely quickly without influence from neighboring pixels, and with minimal influence of the absolute light intensity. This creates inherent advantages such as low latency vision without requiring high power or being constrained to uniform and well-lit environments. In this way, event-based cameras are attractive for motion based tasks which require precise timing and are ideally invariant under extreme changes in lighting conditions. Other advantages of event based vision, such as the potential for vision with low computational cost owing to its sparse, asynchronous output, can be realized with the development of novel data processing techniques.

SUMMARY

According to an aspect of an example embodiment, a method may include obtaining a set of events, of a set of pixels of a dynamic vision sensor, associated with an object; determining a set of voltages of the set of pixels, based on the set of events; generating a set of images, based on the set of voltages of the set of pixels; inputting the set of images into a first neural network configured to output a visual motion estimation of the object; inputting the set of images into a second neural network configured to output a confidence score of the visual motion estimation output by the first neural network; obtaining the visual motion estimation of the object and the confidence score of the visual motion estimation of the object, based on inputting the set of images into the first neural network and the second neural network; and providing the visual motion estimation of the object and the confidence score.

According to an aspect of an example embodiment, a device may include a memory configured to store instructions; and a processor configured to execute the instructions to: obtain a set of events, of a set of pixels of a dynamic vision sensor, associated with an object; determine a set of voltages of the set of pixels, based on the set of events; generate a set of images, based on the set of voltages of the set of pixels; input the set of images into a first neural network configured to output a visual motion estimation of the object; input the set of images into a second neural network configured to output a confidence score of the visual motion estimation output by the first neural network; obtain the visual motion estimation of the object and the confidence score of the visual motion estimation of the object, based on inputting the set of images into the first neural network and the second neural network; and provide the visual motion estimation of the object and the confidence score.

According to an aspect of an example embodiment, non-transitory computer-readable medium may store instructions one or more instructions that, when executed by one or more processors of a device, cause the one or more processors to: obtain a set of events, of a set of pixels of a dynamic vision sensor, associated with an object; determine a set of voltages of the set of pixels, based on the set of events; generate a set of images, based on the set of voltages of the set of pixels; input the set of images into a first neural network configured to output a visual motion estimation of the object; input the set of images into a second neural network configured to output a confidence score of the visual motion estimation output by the first neural network; obtain the visual motion estimation of the object and the confidence score of the visual motion estimation of the object, based on inputting the set of images into the first neural network and the second neural network; and provide the visual motion estimation of the object and the confidence score.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

Example embodiments of the present disclosure are directed to methods and systems for obtaining visual motion estimation of an object and confidence scores of the visual motion estimation of the object using a set of neural networks. The example embodiments obtain the visual motion estimation using a subset of pixels of a pixel array of a dynamic vision sensor, and obtain respective visual motion estimation values and confidence scores for each subset of the pixel array. In this way, the example embodiments permit faster and more accurate visual motion estimation with low computational cost, thereby reducing latency and conserving processor and memory resources of visual motion estimation devices.

Figure 1:
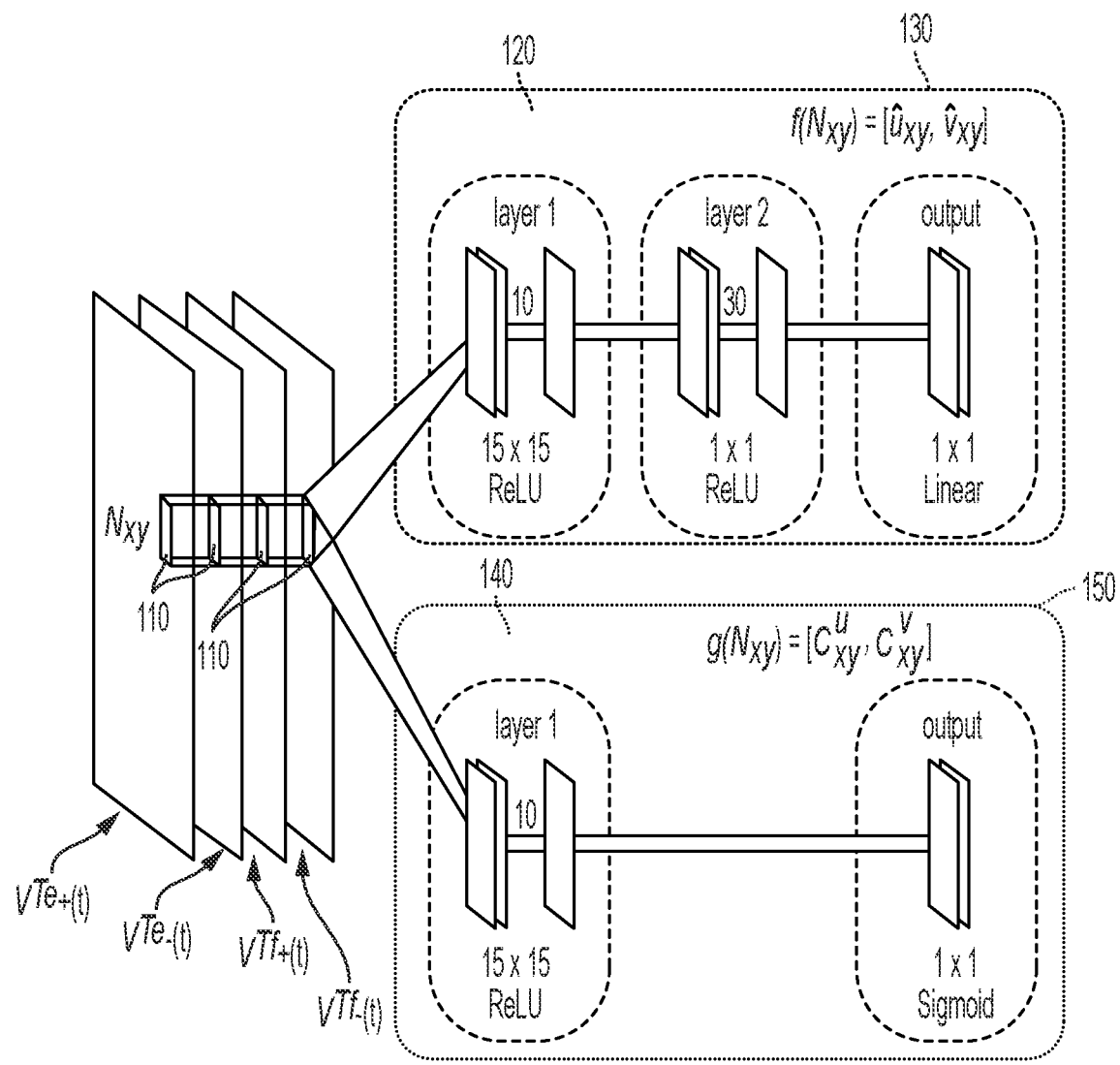
FIG. 1 is a diagram of an example system for obtaining a visual motion estimation of an object and a confidence score of the visual motion estimation using a set of neural networks according to an embodiment.

FIG. 1 is a diagram of an example system for obtaining a visual motion estimation of an object and a confidence score of the visual motion estimation using a set of neural networks according to an embodiment.

As shown in FIG. 1, a visual motion estimation device may generate a set of images 110, based on a set of voltages of a set of pixels of a dynamic vision sensor. Further, the visual motion estimation device may input the set of images 110 into a first neural network 120 configured to output a visual motion estimation 130 of an object detected by the dynamic vision sensor, and may input the set of images 110 into a second neural network 140 configured to output a confidence score 150 of the visual motion estimation 130 output by the first neural network 120. The visual motion estimation device may obtain the visual motion estimation 130 of the object and the confidence score 150 of the visual motion estimation 130 of the object, based on inputting the set of images 110 into the first neural network 120 and the second neural network 140. Further still, the visual motion estimation device may provide the visual motion estimation 130 of the object and the confidence score 150.'

The visual motion estimation and the confidence score may be utilized by devices that communicate with the dynamic vision sensor. For example, a device of an autonomous vehicle may utilize the visual motion estimation and the confidence score to control a trajectory of the autonomous vehicle, to avoid a collision, to output a warning, or the like. As another example, a surveillance system may utilize the visual motion estimation and the confidence score to surveil a particular area, to notify an authority, or the like. As yet another example, a robot may utilize the visual motion estimation and the confidence score to manipulate a component, to avoid a collision, to route plan, or the like. In this way, some implementations herein permit devices associated with event-based cameras to more accurately and quickly ascertain motion of the devices and/or surrounding objects, and do so while conserving processor and/or memory resources based on the reduced computational complexity of some implementations herein.

Figure 2:
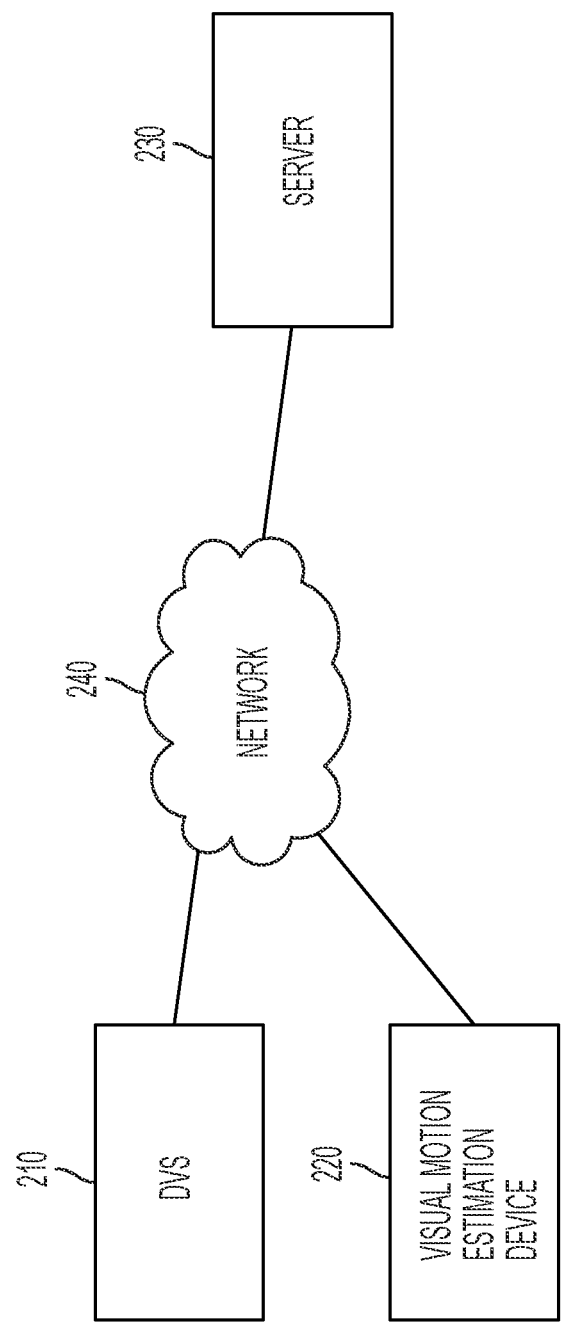
FIG. 2 is a diagram of devices of the system for obtaining a visual motion estimation of an object and a confidence score of the visual motion estimation using a set of neural networks according to an embodiment.

FIG. 2 is a diagram of devices of the system for obtaining a visual motion estimation of an object and a confidence score of the visual motion estimation using a set of neural networks according to an embodiment. FIG. 2 includes a DVS 210, a visual motion estimation device 220, a server 230, and a network 240. The DVS 210, the visual motion estimation device, and the server 230 may interconnect via wired connections, wireless connections, or a combination of wired and wireless connections.

DVS 210 includes one or more devices configured to detect a change in light intensity based on a motion of an object with respect to the DVS 210. For example, the DVS 210 may be a DVS, a neuromorphic camera, a silicon retina, an imaging sensor, or the like.

Visual motion estimation device 220 includes one or more devices configured to obtain a visual motion estimation of an object and a confidence score of the visual motion estimation using a set of neural networks. For example, the visual motion estimation device 220 may include one or more computing devices. The DVS 210 and the visual motion estimation device 220 may be integrated according to an example embodiment. Further, the visual motion estimation device 220 may be fixed in a particular location. For example, the visual motion estimation device 220 may be a surveillance device for an area. Alternatively, the visual estimation device 220 may be integrated with a moving object, such as a drone, a robot, a vehicle, or the like.

The server 230 includes one or more devices configured to communicate with the visual motion estimation device 220. For example, the server 230 may be a server, a computing device, or the like. The server 230 may train and provide a first neural network, a second neural network, and a third neural network to the visual motion estimation device 220.

Network 240 includes one or more wired and/or wireless networks. For example, network 240 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
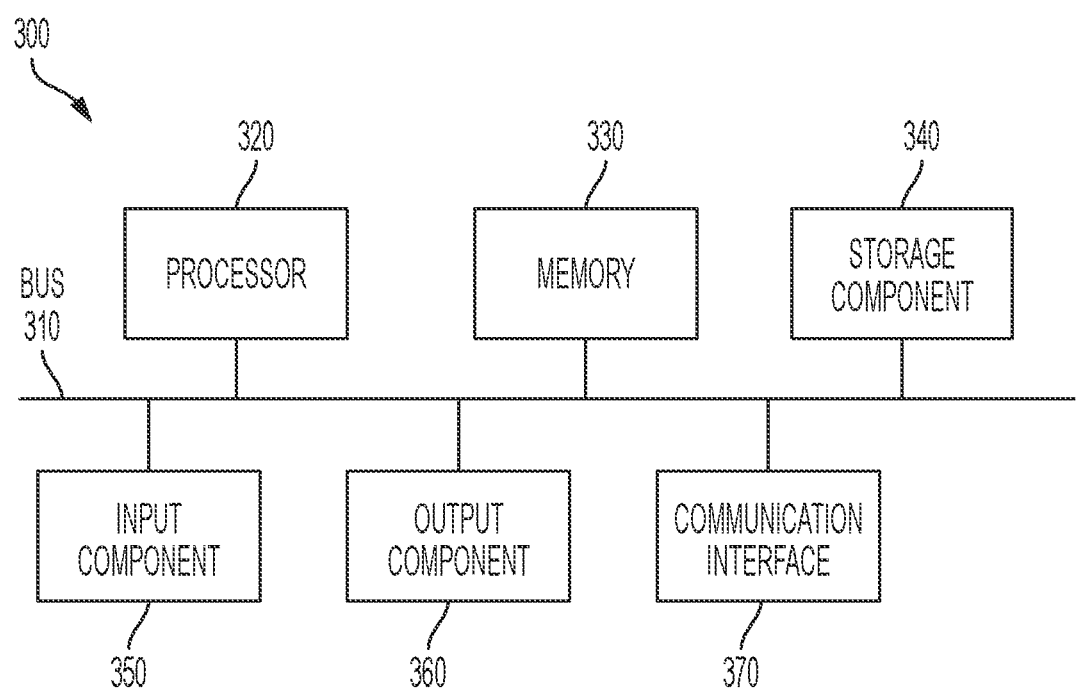
FIG. 3 is a diagram of components of the devices of FIG. 2 according to an embodiment.

FIG. 3 is a diagram of components of one or more devices of FIG. 2 according to an embodiment. Device 300 may correspond to the visual motion estimation device 220, and/or the server 230.

As shown in FIG. 3, the device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Process 320 includes one or more processors capable of being programmed to perform a function.

Memory 330 includes a random access memory (RAM), a read only memory (ROM), and/or another type of dynamic or static storage device (e.g., a flash memory, a magnetic memory, and/or an optical memory) that stores information and/or instructions for use by the processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits the device 300 to receive information, such as via user input (e.g., a touch screen display, a keyboard, a keypad, a mouse, a button, a switch, and/or a microphone). The input component 350 may include a sensor for sensing information (e.g., a global positioning system (GPS) component, an accelerometer, a gyroscope, an imaging sensor, and/or an actuator). The input component 350 may be the DVS 210.

Output component 360 includes a component that provides output information (e.g., velocity estimation) from device 300 (e.g., a display, a speaker, and/or one or more light-emitting diodes (LEDs)).

Communication interface 370 includes a transceiver-like component (e.g., a transceiver and/or a separate receiver and transmitter) that enables the device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. The device 300 may perform these processes based on the processor 320 executing software instructions stored by a non-transitory computer-readable medium, such as the memory 330 and/or the storage component 340. A computer-readable medium is defined herein as a non-transitory memory device. A memory device includes memory space within a single physical storage device or memory space spread across multiple physical storage devices.

Software instructions may be read into the memory 330 and/or the storage component 340 from another computer-readable medium or from another device via communication interface 370. When executed, software instructions stored in memory 330 and/or storage component 340 may cause processor 320 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
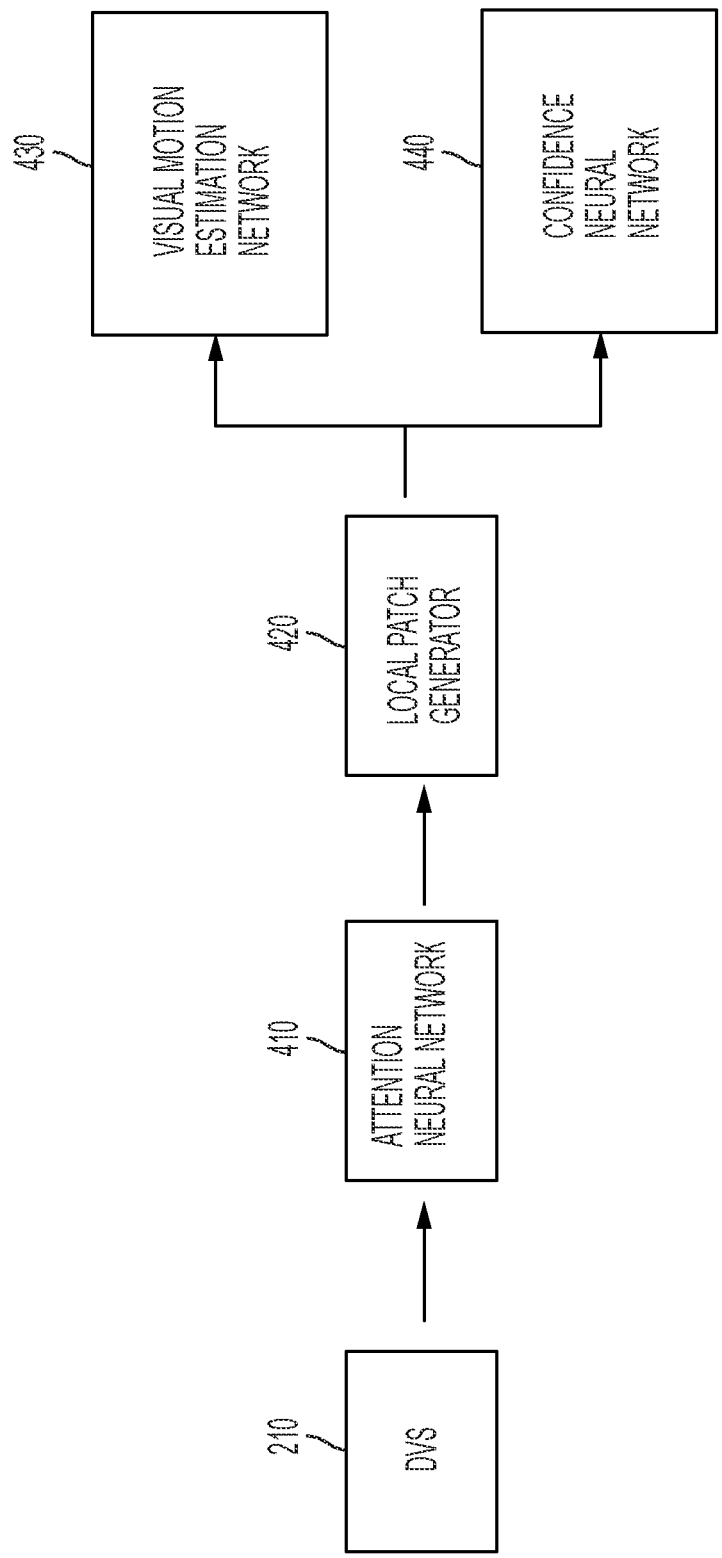
FIG. 4 is a diagram of components of a visual motion estimation device according to an embodiment.

FIG. 4 is a diagram of components of a visual motion estimation device according to an embodiment. FIG. 4 includes an attention neural network 410, a local patch generator 420, a visual motion estimation neural network 430, and a confidence neural network 440.

The attention neural network 410 may be a neural network configured to determine a size of a set of pixels to generate images for visual motion estimation and confidence score generation. For example, the attention neural network 410 may determine a size of a P×Q array that is a subset of an M×N pixel array of the DVS 210. The P×Q array may be referred to as a "local patch." The DVS 210 may include an M×N array of pixels. Each pixel of the DVS 210 may include a coordinate value (x, y) in the M×N array. M may be equal to N, greater than N, or less than N. The set of pixels may be P×Q pixels, etc. P may be equal to Q, greater than Q, or less than Q. Further, P×Q may be equal to M×N or less than M×N.

The DVS 210 includes a set of pixels that operate independently and asynchronously. Each pixel of the DVS 210 stores a predetermined brightness level, and compares a current brightness level to the predetermined brightness level. Based on determining that the difference in brightness level satisfies a threshold, the pixel generates an event including a pixel address of the pixel, a timestamp of the event, the polarity (e.g., positive or negative) of the brightness change, a brightness level of the event, or the like.

The attention network 410 may be configured to determine a size of the P×Q array based on the DVS 210, a type of the object to be detected, a size of the object to be detected, a number of objects to be detected, a speed of the object, a speed of the DVS 210, etc.

The local patch generator 420 may be configured to generate a local patch from an image obtained by the DVS 210, based on the size of the set of pixels (i.e., the P×Q array). For example, the local patch generator 420 may obtain an input image from the DVS 210, and generate a set of local batches based on the size of the set of pixels.

The visual motion estimation neural network 430 may be configured to output a visual motion estimation of the object. For example, the visual motion estimation neural network 430 may obtain a set of images, and output a visual motion estimation of the object, based on the set of images.

The confidence neural network 440 may be configured to output a confidence score of the visual motion estimation output by the visual motion estimation neural network 430. For example, the confidence neural network 440 may obtain the set of images used by the visual motion estimation neural network 430 to generate the visual motion estimation, and output a confidence score of the visual motion estimation output by the visual motion estimation neural network 430.

Figure 5:
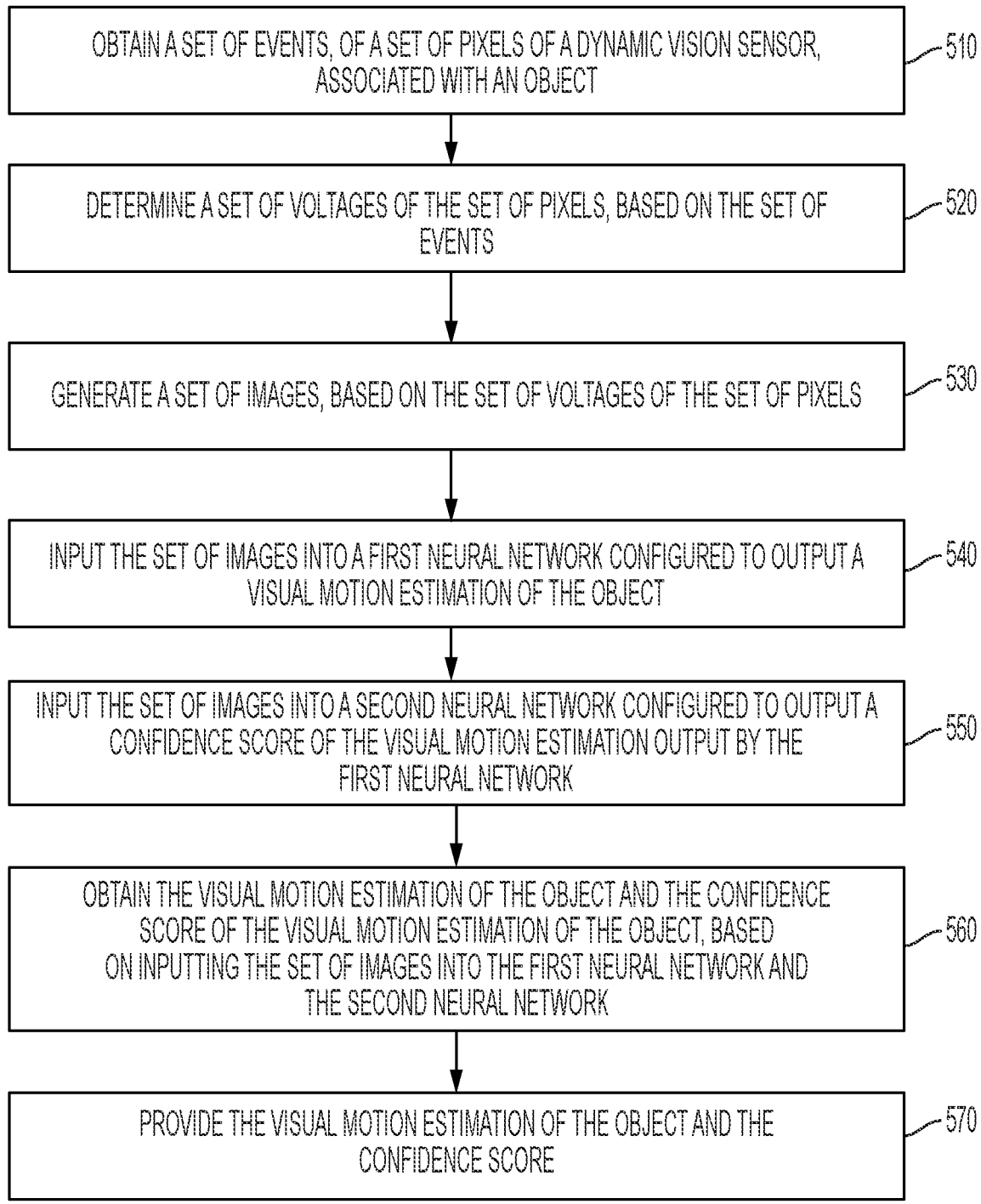
FIG. 5 is a flowchart of a method for obtaining a visual motion estimation of an object and a confidence score of the visual motion estimation using a set of neural networks.

FIG. 5 is a flowchart of a method for obtaining a visual motion estimation of an object and a confidence score of the visual motion estimation using a set of neural networks. According to some embodiments, one or more operations of FIG. 5 may be performed by the visual motion estimation device 220. Additionally, or alternatively, one or more operations may be performed by the DVS 210 and/or the server 230.

As shown in FIG. 5, the method may include obtaining a set of events, of a set of pixels of a dynamic vision sensor, associated with an object (operation 510). For example, the visual motion estimation device 220 may obtain a set of events associated with an object, based on an output of a set of pixels of the DVS 210.

Each pixel of the DVS 210 may be configured to detect a change in light intensity. For example, the DVS 210 may detect a change in light intensity based on a motion of an object with respect to the DVS 210. The object may include any type of underlying object that can be detected by the DVS 210 (e.g., a person, a vehicle, a machine, an animal, an item, or the like). The DVS 210 may be configured to provide, to the visual motion estimation device 220, an event based on a pixel of the DVS 210 detecting a change in light intensity.

The event may include a coordinate value of the pixel of the DVS 210 that detected the change in light intensity, a polarity value of the change in light intensity, an intensity value of light, and a time at which the change in light intensity was detected. For example, the visual motion estimation device 220 may obtain, from the DVS 210, a sequence of events (S) as denoted below. The sequence of events (S) may include an i-th event ($s_i$) through a K-th event ($s_K$). The i-th event may include a coordinate value ($x_i$, $y_i$) of the pixel that detected the i-th event ($s_i$), a polarity value ($p_i$) of the i-th event ($s_i$), and a time of the i-th event ($s_i$).

$$S = \{s_i\}_{i=1}^{K}, s_i = [x_i, y_i, p_i, t_i].$$

As further shown in FIG. 5, the method may include determining a set of voltages of the set of pixels, based on the set of events (operation 520). For example, the visual motion estimation device 220 may determine a set of voltages of the set of pixels of the DVS 210, based on the set of events detected by the DVS 210.

The visual motion estimation device 220 may determine a voltage value (v(t)) for a pixel using the following function:

$$v(t) = \int_{-\infty}^{t} I(s) \cdot e^{-(t-s)/\tau} ds = \sum_{t_i \leq t} e^{-(t-t_i)/\tau}$$

The visual motion estimation device 220 may be configured to determine a voltage value (v(t)) for a pixel using a set of time constants τ. For example, the visual motion estimation device 220 may determine a first voltage value of a pixel using a first time constant ($\tau_{slow}$), and may determine a second voltage value of the pixel using a second time constant ($\tau_{fast}$). Further, the visual motion estimation device 220 may be configured to determine the first time constant and the second time constant based on the following function:

$$\frac{\tau_{slow} - \tau_{fast}}{\tau_{slow}\tau_{fast}\log(\tau_{slow}/\tau_{fast})} = \frac{2R}{w}$$

As shown above, "R" may refer to a pixel speed, and "w" may refer to a width of pixels of the DVS 210. According to an embodiment, the first time constant may be 20 ms, and the second time constant may be 10 ms. However, it should be understood that the visual motion estimation device 220 may be configured to determine n voltage values of a pixel using n time constants (e.g., one, two, three, six, etc.) having any particular value(s).

As further shown in FIG. 5, the method may include generating a set of images, based on the set of voltages of the set of pixels (operation 530). For example, the visual motion estimation device 220 may generate a set of images, based on the set of voltages of the set of pixels of the DVS 210.

The visual motion estimation device 220 may generate the set of images based on grouping voltages of the set of pixels based on polarity and time constant. For example, the visual motion estimation device 220 may generate a first image by grouping voltages of the set of pixels based on a positive polarity and a first time constant ($\tau_{slow}$). Further, the visual motion estimation device 220 may generate a second image by grouping voltages of the set of pixels based on a negative polarity and the first time constant. Further still, the visual motion estimation device 220 may generate a third image by grouping voltages of the set of pixels based on a positive polarity and a second time constant ($\tau_{fast}$). Further still, the visual motion estimation device 220 may generate a fourth image by grouping voltages of the set of pixels based on a negative polarity and the second time constant.

As further shown in FIG. 5, the method may include inputting the set of images into a first neural network configured to output a visual motion estimation of the object (operation 540). For example, the visual motion estimation device 220 may input the set of images into the visual motion estimation neural network 430.

The input to the first neural network may be denoted as:

$$N_{xy}(t) = \left\{ v_{(x+a)(y+b)}^{\tau_{slow}^{-}}(t), v_{(x+a)(y+b)}^{\tau_{fast}^{-}}(t), v_{(x+a)(y+b)}^{\tau_{slow}^{+}}(t), v_{(x+a)(y+b)}^{\tau_{fast}^{+}}(t) \right\}_{a,b=-7}^{7}$$

As shown above, "a" and "b" define the number of pixels of the set of images. For example, the image may be a 15×15 image of voltages of pixels. It should be understood that the size of the P×Q array may be a different size than as compared to 15×15.

Figure 6:
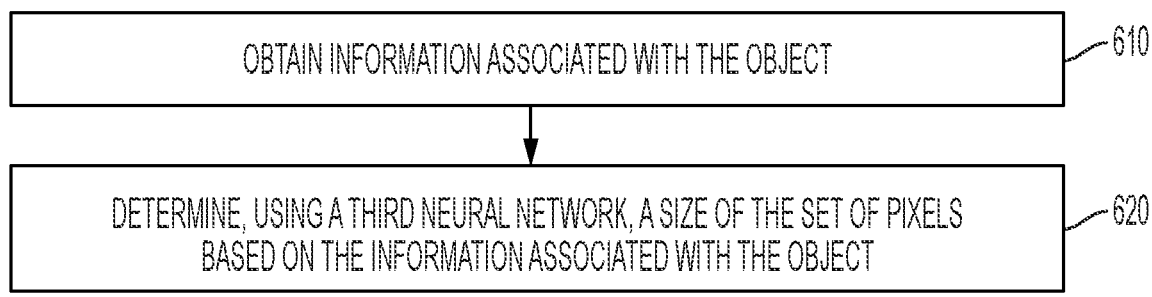
FIG. 6 is a flowchart of a method for determining a size of a set of pixels to be used to generate a set of images using a neural network.

The visual motion estimation device 220 may be configured to determine a size of the set of pixels to be used to generate the set of images. For example, and referring to FIG. 6, the visual motion estimation device 220 may obtain information associated with the object (operation 610), and determine, using a third neural network, a size of the set of pixels based on the information associated with the object (operation 620). For example, the information associated with the object may be a type of the object (e.g., a car, a machine, a human, a sign, etc.), a size of the object (e.g., a measurement value, geometry information, etc.), a number of objects to be detected by the DVS 210, a location of the object, a timeframe during which object detection is to be performed, a physical location of the DVS 210 in relation to the object, a device to which the DVS 210 is mounted, or the like.

The first neural network may be configured to output a visual motion estimation based on the input images, as shown below:

$$f(N_{xy}(t)) = [\hat{u}_{xy}^{P}(t), \hat{v}_{xy}^{P}(t)]_{p},$$

The visual motion estimation device 220 may be configured to generate a set of visual motion estimation values for a set of axes. For example, the visual motion estimation device 220 may be configured to generate a visual motion estimation value $u_p$ and $v_p$ for theta values p of zero, π/8, π/4, 3π/8, etc.

As further shown in FIG. 5, the method may include inputting the set of images into a second neural network configured to output a confidence score of the visual motion estimation output by the first neural network (operation 550). For example, the visual motion estimation device 220 may input the set of images into the confidence neural network 440.

The input to the second neural network may be the same as the input to the first neural network, and may be denoted as:

$$N_{xy}(t) = \left\{ v_{(x+a)(y+b)}^{\tau_{slow}^{-}}(t), v_{(x+a)(y+b)}^{\tau_{fast}^{-}}(t), v_{(x+a)(y+b)}^{\tau_{slow}^{+}}(t), v_{(x+a)(y+b)}^{\tau_{fast}^{+}}(t) \right\}_{a,b=-7}^{7}$$

The second neural network may be configured to output a confidence score of the visual motion estimation of the first neural network based on the set of images, as denoted below:

$$g(N_{xy}(t))=[c_{xy}{}^{up}(t),c_{xy}{}^{vp}(t)],$$

As further show in FIG. 5, the method may include obtaining the visual motion estimation of the object and the confidence score of the visual motion estimation of the object, based on inputting the set of images into the first neural network and the second neural network (operation 560). For example, the visual estimation device 220 may obtain the visual motion estimation of the object and the confidence score, based on outputs of the first neural network and the second neural network.

As further shown in FIG. 5, the method may include providing the visual motion estimation of the object and the confidence score (operation 570). For example, the visual motion estimation device 220 may provide the visual motion estimation of the object and the confidence score to downstream applications.

Although FIG. 5 shows example operations, the method may include additional operations, fewer operations, different operations, or differently arranged operations than those depicted in FIG. 5. Additionally, or alternatively, two or more of the operations of the method may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
   obtaining a set of events, of a set of pixels of a dynamic vision sensor, associated with an object;
   determining, for each pixel of the set of pixels, a set of voltages corresponding to a set of time constants, based on the set of events;
   grouping the set of voltages of the set of pixels into a set of voltage groups, based on the set of time constants and respective polarities of the set of pixels;
   generating, for each voltage group in the set of voltage groups, an image based on voltages corresponding to that voltage group, resulting in a set of images;
   inputting the set of images into a first neural network configured to output a visual motion estimation of the object;
   inputting the set of images into a second neural network configured to output a confidence score of the visual motion estimation output by the first neural network;
   obtaining the visual motion estimation of the object and the confidence score of the visual motion estimation of the object, based on inputting the set of images into the first neural network and the second neural network; and
   providing the visual motion estimation of the object and the confidence score.

2. The method of claim 1, wherein the set of events includes coordinate values of the set of pixels, polarity values of the set of pixels, and a time of the set of events.

3. The method of claim 1, further comprising:
   determining a first set of voltage values based on a first time constant of the set of time constants;
   determining a second set of voltage values based on a second time constant of the set of time constants, the second time constant being different than the first time constant; and
   generating the set of images based on the first set of voltage values and the second set of voltage values.

4. The method of claim 1, further comprising:
   determining, using a third neural network, a size of the set of pixels to be used to generate the set of images.

5. The method of claim 4, further comprising:
   determining the size of the set of pixels based on a type of the object.

6. The method of claim 4, further comprising:
   determining the size of the set of pixels based on a size of the object.

7. The method of claim 4, further comprising:
   determining the size of the set of pixels based on a number of objects to be detected by the dynamic vision sensor.

8. A device comprising:
   a memory configured to store instructions; and
   a processor configured to execute the instructions to:
     obtain a set of events, of a set of pixels of a dynamic vision sensor, associated with an object;
     determine, for each pixel of the set of pixels, a set of voltages corresponding to a set of time constants, based on the set of events;
     group the set of voltages of the set of pixels into a set of voltage groups, based on the set of time constants and respective polarities of the set of pixels;
     generate, for each voltage group in the set of voltage groups, an image based on voltages corresponding to that voltage group, to result in a set of images;

input the set of images into a first neural network configured to output a visual motion estimation of the object;
input the set of images into a second neural network configured to output a confidence score of the visual motion estimation output by the first neural network;
obtain the visual motion estimation of the object and the confidence score of the visual motion estimation of the object, based on inputting the set of images into the first neural network and the second neural network; and
provide the visual motion estimation of the object and the confidence score.

9. The device of claim 8, wherein the set of events includes coordinate values of the set of pixels, polarity values of the set of pixels, and a time of the set of events.

10. The device of claim 8, wherein the processor is further configured to:
determine a first set of voltage values based on a first time constant of the set of time constants;
determine a second set of voltage values based on a second time constant of the set of time constants, the second time constant being different than the first time constant; and
generate the set of images based on the first set of voltage values and the second set of voltage values.

11. The device of claim 8, wherein the processor is further configured to:
determine, using a third neural network, a size of the set of pixels to be used to generate the set of images.

12. The device of claim 11, wherein the processor is further configured to:
determine the size of the set of pixels based on a type of the object.

13. The device of claim 11, wherein the processor is further configured to:
determine the size of the set of pixels based on a size of the object.

14. The device of claim 11, wherein the processor is further configured to:
determine the size of the set of pixels based on a number of objects to be detected by the dynamic vision sensor.

15. A non-transitory computer-readable medium storing instructions, the instructions comprising: one or more instructions that, when executed by one or more processors of a device, cause the one or more processors to:
obtain a set of events, of a set of pixels of a dynamic vision sensor, associated with an object;
determine, for each pixel of the set of pixels, a set of voltages corresponding to a set of time constants, based on the set of events;
group the set of voltages of the set of pixels into a set of voltage groups, based on the set of time constants and respective polarities of the set of pixels;
generate, for each voltage group in the set of voltage groups, an image based on voltages corresponding to that voltage group, to result in a set of images, based on the set of voltages of the set of pixels;
input the set of images into a first neural network configured to output a visual motion estimation of the object;
input the set of images into a second neural network configured to output a confidence score of the visual motion estimation output by the first neural network;
obtain the visual motion estimation of the object and the confidence score of the visual motion estimation of the object, based on inputting the set of images into the first neural network and the second neural network; and
provide the visual motion estimation of the object and the confidence score.

16. The non-transitory computer-readable medium of claim 15, wherein the set of events includes coordinate values of the set of pixels, polarity values of the set of pixels, and a time of the set of events.

17. The non-transitory computer-readable medium of claim 15, wherein the one or more instructions further cause the one or more processors to:
determine a first set of voltage values based on a first time constant of the set of time constants;
determine a second set of voltage values based on a second time constant of the set of time constants, the second time constant being different than the first time constant; and
generate the set of images based on the first set of voltage values and the second set of voltage values.

18. The non-transitory computer-readable medium of claim 15, wherein the one or more instructions further cause the one or more processors to:
determine, using a third neural network, a size of the set of pixels to be used to generate the set of images.

19. The non-transitory computer-readable medium of claim 18, wherein the one or more instructions further cause the one or more processors to:
determine the size of the set of pixels based on a type of the object.

20. The non-transitory computer-readable medium of claim 18, wherein the one or more instructions further cause the one or more processors to:
determine the size of the set of pixels based on a size of the object.

\* \* \* \* \*